No. 652,029. Patented June 19, 1900.
H. LENTZ.
BALANCED VALVE.
(Application filed June 19, 1899.)
(No Model.)
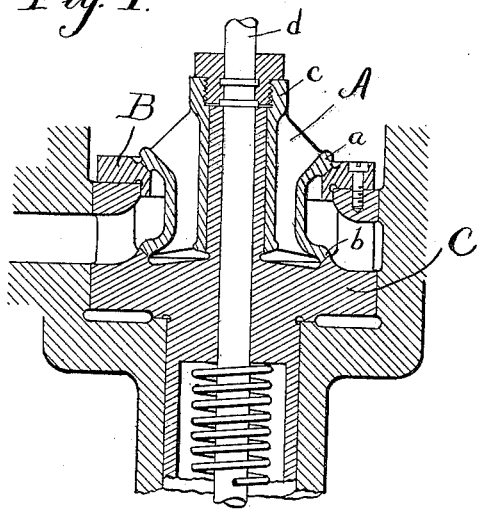
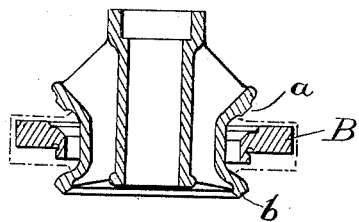
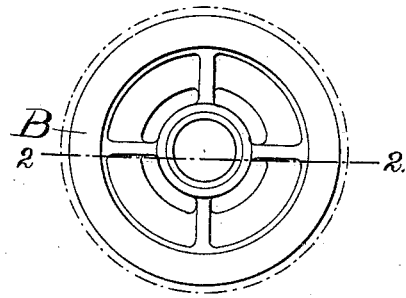
Witnesses:
E. F. Wilson.
Inventor:
Hugo Lentz
By Rudolph Wm. Lotz
Atty.

# UNITED STATES PATENT OFFICE.

HUGO LENTZ, OF BRÜNN, AUSTRIA-HUNGARY.

BALANCED VALVE.

SPECIFICATION forming part of Letters Patent No. 652,029, dated June 19, 1900.

Application filed June 19, 1899. Serial No. 721,155. (No model.)

*To all whom it may concern:*

Be it known that I, HUGO LENTZ, a citizen of Germany, residing at Brünn, in the Province of Mähren, Austria-Hungary, have invented certain new and useful Improvements in Balanced Double-Beat Valves; and I do hereby declare the following to be a full, clear, and exact description of the invention, such as will enable others skilled in the art to which it appertains to make and use the same.

My invention relates to a novel construction in a balanced double-seat valve, the object being to provide a valve of this description in which the upper and lower seats are of the same diameter; and it consists in the features of construction and combinations of parts hereinafter fully described and claimed.

In the accompanying drawings, illustrating my invention, Figure 1 is a vertical longitudinal section of a valve and its seats constructed in accordance with my invention. Fig. 2 is a similar section on the line 2 2 of Fig. 3, showing the valve and one seat thereof, which are made from a single piece of metal, and indicating by dot-and-dash lines the form of the casting. Fig. 3 is a top plan view looking down on Fig. 2.

Double-seat valves as they are generally made are very badly balanced for the reason that one end of the valve must be small enough to pass through one of the seats, so that the seats are necessarily of widely-different diameters, thus causing unequal pressures on the ends of the valve, the greater pressure being on the larger end of the valve. Such badly-balanced valves when used in puppet-valve engines cause unequal strains, owing to the fact that the pressure holding the valve down must be overcome by the gear, which produces great tensions in the several parts of the same and makes exact regulation of the speed very difficult. My present invention overcomes these difficulties.

Referring to the drawings, A indicates a double-seat valve having its upper seat $a$ in a separate ring B, adapted to be mounted in a valve-casing C, and its lower seat $b$ likewise in said casing C. Said ring B is secured in said casing C preferably by means of screws, but may be secured in any other suitable manner. By forming the upper seat in a separate ring B, I am enabled to make both valves of equal diameter, thus perfectly balancing said valve. The said valve A is provided with a central sleeve $c$ for the reception of the valve-stem $d$, which may be secured therein in any suitable manner.

I claim as my invention—

1. A double-seat valve, comprising a valve having flaring ends of practically-equal diameter, and a valve-seat of less diameter than said flaring ends encircling said valve between said ends, substantially as described.

2. A double-seat valve, comprising a hollow member having two flaring ends provided with ground faces of practically-equal diameter, and a valve-seat adapted to receive one of said ground faces encircling said hollow member between its ends, substantially as described.

In testimony whereof I affix my signature in presence of two witnesses.

HUGO LENTZ.

Witnesses:
S. WUNEAL,
W. DRAHOKOSIPIL.